United States Patent [19]
Sari et al.

[11] Patent Number: 5,245,636
[45] Date of Patent: Sep. 14, 1993

[54] DEVICE FOR REDUCING JITTER CAUSED BY POINTER ADJUSTMENTS IN A DIGITAL TELECOMMUNICATION NETWORK

[75] Inventors: Hikmet Sari, Creteil; Georges M. Karam, Paris, both of France

[73] Assignee: Societe Anonyme de Telecommunications, Paris, France

[21] Appl. No.: 776,437

[22] Filed: Oct. 17, 1991

[30] Foreign Application Priority Data

Oct. 17, 1990 [FR] France .................. 90 12802

[51] Int. Cl.$^5$ .............................. H04L 7/00
[52] U.S. Cl. .................. 375/118; 370/102; 370/108
[58] Field of Search .......... 375/106, 117, 118; 370/48, 49, 105.3, 108, 102; 307/590, 597

[56] References Cited

U.S. PATENT DOCUMENTS

| 5,052,025 | 9/1991 | Duff et al. | ............... 375/102 |
| 5,111,485 | 5/1992 | Serack | ............... 375/118 |

FOREIGN PATENT DOCUMENTS 2594277 12/1986 France .
56-21440 7/1981 Japan .

OTHER PUBLICATIONS

"Sonet Desynchronizers", Feb. 1989.
"Results of Simulations of a Possible Desynchronizer Design", May 1989.
"Network Aspects of Pointer Adjustments", Mar. 1989.

*Primary Examiner*—Stephen Chin
*Attorney, Agent, or Firm*—Lowe, Price, LeBlanc & Becker

[57] ABSTRACT

A device for reducing the jitter caused by pointer adjustments in a digital telecommunication network comprising of a circuit inserting in the vicinity of each phase step caused by a pointer adjustment, a plurality of smoothing phase steps in accordance with a deterministic smoothing pattern in order to eliminate, after having passed through a conventional desynchronizer, the quantifying effects of the phase steps. Provision also is made, for the case in which each phase step caused by a pointer adjustment comprises a plurality of bits, in that a control circuit is present to resolve the step into a plurality of elementary steps and to control the insertion of these steps in a manner matched to the rate of occurrence of pointer adjustments. In particular, the device applies to networks based on Synchronous Digital Hierarchy.

20 Claims, 5 Drawing Sheets

DEVICE FOR REDUCING JITTER CAUSED BY POINTER ADJUSTMENTS IN A DIGITAL TELECOMMUNICATION NETWORK

BACKGROUND OF THE INVENTION

The present invention concerns a device for reducing the jitter due to pointer adjustments in a digital telecommunication network.

The invention applies in particular to Synchronous Digital Hierarchy (SDH) networks. Clocks synchronized by one, or more, atomic clocks are used at different network nodes in order that they be highly stable, for instance of the order of $10^{-11}$. However this stability is not perfect and differences in phase and in frequency occur between the clock signals of the various nodes which must be allowed for without losing useful data. This purpose is assigned to the pointer adjustments. When the phase difference between an incoming signal at the node and the local clock signal exceeds a given threshold, a positive or negative pointer adjustment is carried out to relock the signals in phase.

To understand the phenomenon of a pointer adjustment, it must be borne in mind that the signal moves in frames. A frame is a set of binary elements, or bits, of a specified number, which is conveniently represented as a block of octets comprising a given number of rows or lines, each line comprising in turn a specific number of octets, i.e. 8-bit bytes. Illustratively in the case of the STM-1 (Synchronous Transport Module—Level 1) signal defined by the CCITT, a frame contains 19,440 bits arranged on 9 lines each of 270 octets. Not all the octets of a frame serve to move useful information, a number of them serve to monitor and control the transmission. As regards the illustrative STM-1, each line starts with 9 monitoring and controlling octets, called SOH (Section Overhead) followed by an octet called POH (Path Overhead), then by 260 octets which can be divided into 20 zones each comprising 13 octets. Each of these 20 zones comprises 12 useful-information octets and one type W, X, Y or Z octet, using the CCITT terminology. A W octet comprises 8 useful information bits, an X or Y octet includes no useful information, and a Z octet comprises 6 or 7 useful data bits. In what follows below, and in spite of the above discussion, the 261 octets following the 9 SOH octets are useful-information octets. Thereby the discussion shall be simpler without reducing generality.

In the light of the above assumption, a frame therefore carries $9 \times 261 = 2,349$ octets of useful information and $9 \times 9 = 81$ SOH octets for monitoring and control. Among the latter, 3 octets however are preserved to move additional useful information if called for by the phenomenon of pointer adjustments.

As already noted, a pointer adjustment may be positive or negative in order to properly relock the phase regardless of the phase-shift sign involved in the pointer adjustment.

A positive pointer adjustment of a frame means that this frame carries a number of useful data less than the number of useful data in a normal frame unaffected by an pointer adjustment. As regards the illustrative STM-1 signal, any positive or negative pointer adjustment evinces an amplitude set at 3 octets, that is 24 bits. For a frame subject to a positive pointer adjustment, there only moves 2,346 useful data octets because a frame without pointer adjustment moves 2,349. The place preserved in the frame for the three missing octets of useful information is taken up by 3 dummy octets.

A negative pointer adjustment affecting this frame moves a number of useful data octets which is larger than the number of useful data octets of a normal frame. As regards the STM-1 signal, a frame subjected to a negative pointer adjustment therefore moves 2,352 useful data octets because a frame lacking a pointer adjustment moves 2,349. As a priori, a frame is provided with only 2,349 octets for moving useful data, in this case the useful data must be made to spill over the monitoring and control data by using the reserved 3 monitoring and control octets already mentioned.

To process and regenerate useful information moved by a signal transmitted through the network, said signal is made to generate in known manner a data signal and a clock signal Again in known manner, the transitions denoting the monitoring and control bits are eliminated from the clock signal in order to have available a modified clock signal of which the transitions evince only useful information bits. Such a modified clock signal when, for instance, applied to the write input of a memory comprising an input receiving the data signal, allows storing into this memory only the useful information bits while ignoring the monitoring and control bits Hereafter, this modified clock signal shall be called the write clock or write clock signal.

Accordingly, a priori, the write clock is in the form of bursts, each including a plurality of clock pulses separated by stages without any clock pulse. The bursts of clock pulses correspond to the useful information bits of the transmitted signal whereas the intervals correspond to the monitoring and control bits of this transmitted signal In principle, each frame is transmitted line by line. In the case of the illustrative STM-1 signal and in the light of the simplified discussion herein, as a rule, each line comprises initially 9 SOH monitoring and control octets which are followed by 261 octets of useful information. Accordingly the clock write signal ordinarily comprises intervals with a duration corresponding to 9 octets, i.e. 72 bits which separate bursts comprising as many clock pulses as there are useful information bits per line, in this case therefore 2,088 clock pulses.

This holds for all lines of frames not subjected to a pointer adjustment. However as soon as a pointer adjustment materializes for a frame, this frame includes a line in which the number of useful information bits no longer is 2,088. Consequently, that part of the write clock signal corresponding to this line either will evince a lengthening of the interval followed by a shortening of the next burst, or a shortening of the interval followed by a lengthening of the next burst.

As regards a positive pointer adjustment in a frame of an STM-1 signal, the interval shall be 96 bits instead of 72 because the first 24 bits ordinarily assigned to the useful information of the line in this case are dummy bits which need not be processed and stored. The following burst then comprises 2,064 clock pulses instead of 2,088.

As regards a negative pointer adjustment in a frame of an STM-1 signal, the interval is 48 bits instead of 72 because the last 24 bits ordinarily assigned to monitoring and control in this case are useful information bits which must be processed and stored. Then the following burst comprises 2,112 clock pulses instead of 2,088.

DISCLOSURE OF THE INVENTION

It is clear that the fluctuations in interval duration and in duration of the write clock bursts are the cause of, for instance, a regenerated signal jitter which if it cannot be entirely eliminated, must at least be minimized for good network functioning.

Again, it is clear that the above applies not only to the illustrative STM-1 signal case, but also to many signals provided with the pointer adjustment mechanisms, regardless of the amplitudes and frequency of the phase steps implicit in the appearance of the pointer adjustments.

To reduce jitter, it is known to make use of a circuit, called "de-synchronizer" by one of ordinary skill in the art, that includes a phase-lock loop used to filter the write-clock signal Again, in known manner, such as desynchronizer also includes a buffer memory into which are written the data at the rate of the write clock. The data so stored in the buffer memory are read at the rate of the write clock filtered in the phase-lock loop, said filtered clock consequently being called read clock or read clock signal If called for, a circuit, called the "bit flow circuit" by one of ordinary skill in the art, is provided upstream of the above desynchronizer. Such a circuit is used when in the case of the above STM-1 signal a phase step due to an elementary pointer adjustment corresponds to a plurality of bits. The bit flow circuit transforms each step of a plurality of bits into as many steps of 1 bit, which it stretches in time to reduce phase fluctuation. For the STM-1 signal, for instance, it was noted that each phase step of 24 bits corresponds to 24 phase steps of 1 bit which the circuit spreads by separating each step from the next by a relatively large time interval This design of a bit flow circuit followed by a conventional desynchronizer, with a phase-lock loop in particular, allows countenancing the relatively large phase steps generated by the pointer-adjustment mechanisms and their very rare occurrence when the clocks used are highly stable in the manner provided for the STM-1 signal.

Obviously the bit-flow circuit is not always required, in particular not when the pointer-adjustment mechanism generates solely steps of 1 bit, and this is the case especially in the present "plesiochronous", that is nearly synchronous circuit.

Whether a bit-flow circuit is used or not, it is clear that the quantification of the phase steps, that is, the fact that any phase step has an amplitude of at least 1 bit, is the source of the fluctuations at the output of the conventional desynchronizer, in particular when the frequency of the 1-bit phase steps is within the passband of the phase loop of this desynchronizer.

BACKGROUND ART

The documents entitled SONET DESYNCHRONIZERS of 8 February 1989 and RESULTS OF SIMULATIONS OF A POSSIBLE DESYNCHRONIZER of May 8, 1989, from British Telecom (Andy Reid, Angle Centre, 403 St John Street, London EC1V 4PL) to the USA standardization commission T1X1, describe the use of a noise generator in a bit-flow circuit followed by a conventional desynchronizer for the purpose of reducing the quantified effects of phase steps. The output signal from this generator is added to the signal which controls the times at which the positive or negative phase steps, caused by the pointer adjustments, must be carried out. As a consequence of the noise-generator, a plurality of one-bit amplitude, positive or negative phase steps are inserted in the clock signal, the number of positive phase steps so inserted being equal, on average, to the number of the negative phase steps so inserted. In the long run these phase steps do not modify the phase which remains controlled by the flow circuit, however, because they are inserted especially near each phase step to be moved, they are the source of smoothing which is evident following filtering in the conventional desynchronizer.

As regards this known device, the noise is triangular or saw-tooth, and its frequency must be decorrelated as much as possible from the frame frequency. This entails using either a separate oscillator or a comparatively complex circuit to generate from the frame frequency a frequency suitable for the noise.

SUMMARY OF THE INVENTION

The object of the present invention is to palliate these drawbacks by providing a device wherein the quantifying effects of the phase steps are reduced thanks to smoothing steps while being free of the requirement of generating a frequency as decorrelated as possible from the frame frequency.

Accordingly, the object of the invention is a device to reduce the jitter caused by the pointer adjustments in a digital telecommunication network, each pointer adjustment entailing at least one phase step with an amplitude of at least 1 bit affecting a clock signal, and comprising:

means for inserting said phase step caused by the pointer adjustment into said clock signal and, in the vicinity of said phase step, a plurality of positive and negative smoothing phase-steps, the number of positive smoothing phase-steps on the average being equal to the number of negative smoothing phase-steps, and means to filter the clock signal provided in the above manner with the preceding phase steps, and thereby to reduce the quantifying effects of said phase step caused by the pointer adjustment, where said device is characterized in that it comprises control means to assign a given duration, or time interval, to the insertion of said phase step caused by the pointer adjustment and to resolve this specific time interval into a plurality of time intervals each corresponding to the transmission of one set of bits, and said insertion means insert into the clock signal corresponding to each of said sets of bits either a positive phase step or no phase step or a negative phase step, depending on a binary smoothing law providing a transition in one direction, no transition or a transition in the other direction, said binary law being defined across the said entire specified time interval and evincing a sufficient number of transitions so that its local average progressively varies from one of the two possible values of said binary law to the other, the direction of these variations being linked to the sign of said phase step caused by the pointer adjustment.

In the device of the invention, the phase-smoothing steps are inserted by a deterministic and stored smoothing law, or a smoothing pattern which does not require generating a decorrelated signal in the manner of the known device. Moreover, and as elucidated below, the shape of the smoothing pattern allows almost perfect elimination of the quantifying effect of the phase steps.

The above mentioned sets of bits either are frames, whereby the device is simplified because the signal is moved in the form of a sequence of frames, or they are rows or lines belonging to these frames, whereby the time interval assigned to the insertion of each phase step is reduced in the case such phase steps are fairly close together in time.

When each pointer adjustment entails a phase step of an amplitude corresponding to a plurality of bits, advantageously, said control means resolve said phase step into a plurality of elementary phase steps of which they increase or lower the insertion rate in the clock signal so as to match the rate at which the pointer adjustments appear.

Compared with the case known to one of ordinary skill in the art by the term "fixed flow" where the time interval and the amplitude of each of the elementary phase steps are fixed beforehand, the above features allow satisfactory operation regardless of the network operating properly or in degraded manner. The expression proper, or normal, operation herein means that all local clocks are synchronized whereas degraded operation denotes operation in which one local clock has accidentally lost its synchronization, i.e., it is no longer synchronized by the above mentioned atomic clock. In normal operation there are few pointer adjustments and preferably the insertion rate, or flow rate, shall be comparatively low, the residual jitter being a direct function of the insertion rate. In degraded operation, with the stability of the clock having lost synchronization being much less than in normal operation, for instance being $10^{-5}$ to $10^{-6}$ in degraded operation rather than $10^{11}$ in normal operation, more substantial residual jitter is allowed than in normal operation, provided however no useful information shall be lost. This assumes a fairly high insertion rate because the pointer adjustments occur fairly frequently in degraded operation. In the device of the invention, the insertion rate varies in relation to the occurrence of the pointer adjustments in order to achieve as low as possible a residual jitter in normal operation without losing useful information in degraded operation. This achievement is impossible at a constant insertion rate because if its magnitude were high, a substantial residual jitter would be the case for normal operation, and if this value were low, useful information would be lost in degraded operation.

Depending on the case of increasing or lowering the insertion rate, said control means increase or lower the amplitude of each elementary phase step or the time interval assigned to inserting each one.

In one embodiment mode, said control means increase the insertion rate when a phase step caused by a pointer adjustment of the same sign as the preceding one occurs before the time interval required to insert this preceding phase step has lapsed, and in the opposite case, said means lower the insertion rate.

In another embodiment, said control means determine the length of a time interval during which the N last pointer adjustments took place, N being a natural number, and increasing or lowering the insertion rate in relation to the magnitude of this time interval.

In this case the circuit reaction for instance to a clock disconnect from a network node is fairly rapid and allows very quickly setting the insertion rate at its proper value. Moreover in the case of a double or triple pointer adjustment, the insertion rate does not increase systematically.

A buffer memory to store the useful information during processing of the clock signal to reduce the jitter is advantageously provided, the useful data being written in step with the clock signal before processing and being read in step with the clock signal following processing, the control means simulating the loading of the buffer memory and increasing or lowering the insertion rate to keep this loading at an intermediate value.

Thereby any danger of buffer-memory overflow is avoided.

In yet another embodiment, said control means include a phase comparator to compare the clock-signal phase before the processing to reduce jitter with the clock-signal phase after said processing, further a filter to filter the signal at the output of said phase comparator, integrating means to integrate over a given time interval the signal at the output of said filter, and decision means to control the insertion of the phase steps in relation to the signal at the integrator output.

In this case said filter advantageously shall include a direct path between its input and its output.

This feature allows achieving simultaneously low residual jitter in normal operation and compensation of wide frequency excursions in degraded operation, while also ensuring low static phase error, which is equivalent to making good use of the buffer memory.

The present invention shall be better understood by means of the description below of several preferred embodiments of jitter-reducing device of the invention and in relation to the attached drawings.

DESCRIPTION OF THE PREFERRED EMBODIMENTS

A circuit reducing the jitter caused by the pointer adjustments in a digital telecommunication circuit will now be described in relation to FIG. 2.

As mentioned above, such a circuit comprises in this case a "bit-flow circuit" 1 and a "desynchronizer" 2.

The circuit 1 includes a buffer memory 11, a control circuit 12 and a phase-step insertion circuit 13.

The buffer memory 11 comprises a write input receiving a data signal D, a write-clock input receiving a binary signal HE1 or write clock, a read-output issuing a data signal D1 and a read-clock input receiving a binary signal HL1 or read-clock.

The control circuit 12 comprises two binary inputs respectively receiving the write clock HE1 and the read clock HL1, further it comprises a binary output emitting a signal H1 or auxiliary clock and a digital output emitting an insertion-command signal CI.

The insertion circuit 13 comprises a digital input receiving the CI signal, further a binary input receiving the H1 signal and a binary output for the signal HL1.

The desynchronizer 2 comprises in known manner a buffer memory 21, an analogue phase comparator 22, a low-pass filter 23 and a voltage-controlled oscillator 24.

The buffer-memory 21 comprises a write input receiving the data signal D1 from the output of the buffer memory 11, further a write-clock input receiving a binary signal HE2 or clock write which is merely the HL1 signal, a read output for the data signal D2 and a read-clock input receiving a binary signal HL2 or read clock.

The phase comparator 22 comprises two binary inputs respectively receiving the write clock HE2 and the read clock HL2 and an analogue output of a signal P proportional to the phase relationship of its input signals.

The low-pass filter 23 comprises an analogue input receiving the signal P and an analogue output of a signal PB.

The oscillator 24 comprises a control input receiving the PB signal and a binary output for the read-clock HL2.

The comparator 22, the filter 23 and the oscillator 24 thus form a conventional phase-lock loop. Illustratively, considering the STM-1 signal, this is a second-order loop with poles in the 100 to 1,000 Hz range.

Figure 1A:
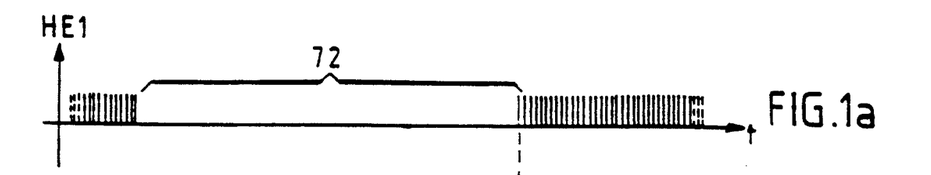
FIGS. 1a, 1b, 1c are time diagrams of clock signals assigned to phase steps caused by pointer adjustments in a digital telecommunication network, said time diagrams already having been mentioned above.
Figure 1B:
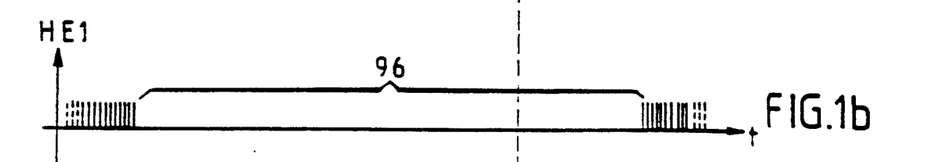
Figure 1C:
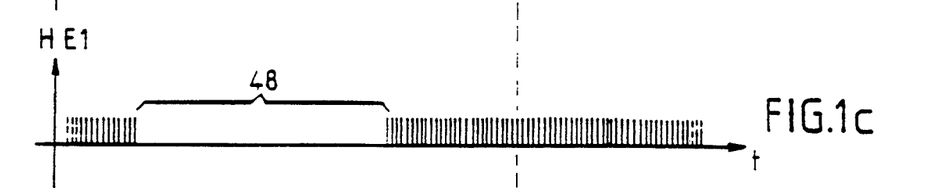

The data signal D and the write-clock HE1 are created in circuits upstream of circuit 1 but omitted because they are known. In particular the write-clock HE1 is generated from the network signal using a circuit for clock-recovery and for suppressing clock pulses corresponding to the bits of the received signal serving for monitoring and control of the transmission. Accordingly, the signal HE1 is as shown in FIGS. 1a, 1b, 1c.

Similarly, and for the sake of simplicity, the circuits downstream of the desynchronizer 2 and serving to make use of the data signal D2 and of the clock HL2 are omitted.

Figure 2:
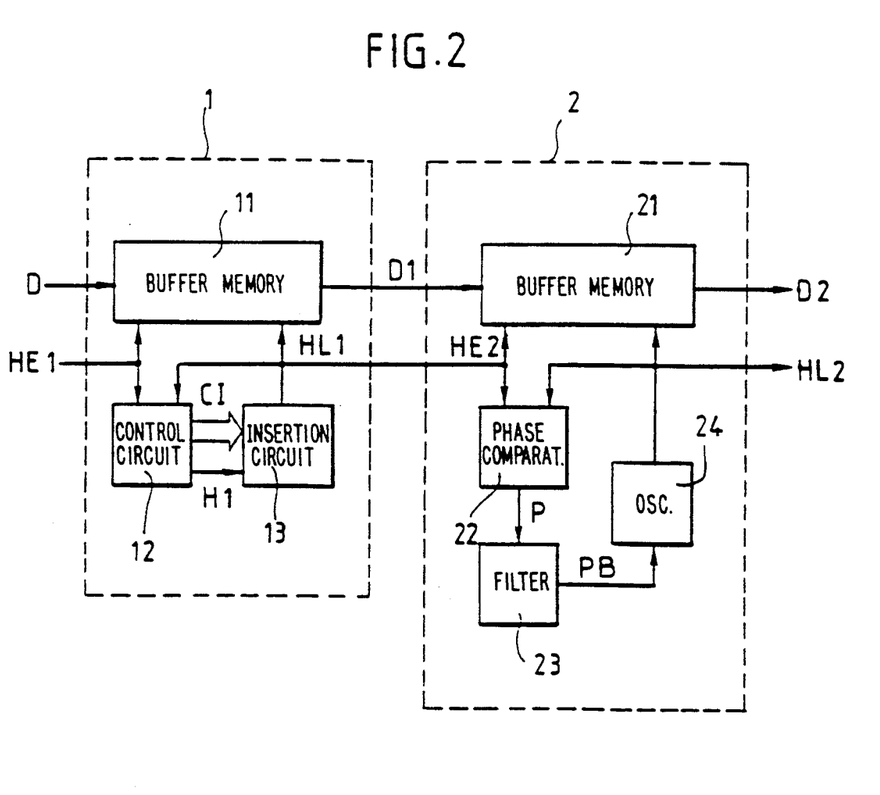
FIG. 2 is a block-circuit diagram of a jitter-reducing circuit of the invention and processing for instance the signals of FIG. 1.

The overall operation of the circuit of FIG. 2 shall be briefly discussed before describing in further detail the control circuit 12 and the insertion circuit 13.

The function of the buffer memory 11 is to store useful-information bits of the signal D during the processing of the HE1 write-clock in order to reduce the jitter. The useful data are written into the buffer memory 11 at the rate of the write clock HE1 and they are read at the rate of the read clock HL1. The size of the buffer memory is sufficient to absorb several very close pointer adjustments.

When a pointer adjustment occurs, whereby, as regards the illustrative STM-1 signal, a negative or positive phase step ensues with an amplitude of 24 bits and which affects the HE1 signal, as shown by FIGS. 1b or 1c, the control circuit will detect this phase step because permanently receiving the clocks HE1 and HL1.

Thereupon the control circuit resolves this 24-bit phase step into a plurality of elementary phase steps, illustratively here into 24 1-bit phase steps and by means of the CI signal instructs the insertion circuit 13 to insert these elementary steps in the auxiliary clock H1.

The auxiliary clock H1 is generated by the control circuit 12 from the write clock HE1 in order to suppress from it the phase steps caused by the pointer adjustments. As noted above in relation to the described embodiment mode, the write clock HE1 comprises a major part of bursts of 2,088 clock pulses separated by intervals of 72 clock pulses similar to that of FIG. 1a. In the case of a positive pointer adjustment, an interval of 96 clock pulses such as shown in FIG. 1b appears in the HE1 signal and is followed by a burst of 2,064 block pulses. In the event of a negative pointer adjustment, an interval of 48 clock pulses occurs in the HE1 signal as shown in FIG. 1c and is followed by a burst of 2,112 clock pulses.

The suppression of the phase steps in the write clock HE1 to achieve the auxiliary clock H1 is tantamount to replacing in the write clock HE1 each interval of 96 clock pulses followed by a burst of 2,064 clock pulses, or each interval of 48 clock pulses followed by a burst of 2,112 clock pulses with an interval of 72 clock pulses followed by a burst of 2,088 clock pulses. Accordingly, the auxiliary clock H1 itself is an ideal clock unaffected by jitter because comprising only intervals all the same and followed by bursts also all the same.

The insertion circuit 13 inserts the elementary, 1-bit phase steps in the "ideal" auxiliary clock H1 at the times determined by the control circuit 12. Moreover, and in accordance with the invention, the insertion of each elementary phase step is carried out by adding in its vicinity a plurality of smoothing phase-steps obeying a smoothing law or pattern as elucidated below.

In manner known per se, the phase-loop desynchronizer 2 filters the clock HE2, that is the clock HL1, in the phase loop in order to eliminate the system jitter linked to the frame organization, and on the other hand to reduce the quantifying effects of each elementary phase step related to the smoothing phase-steps.

A first embodiment mode of the control circuit 12 will now be described in relation to FIG. 3.

In this embodiment, the control circuit 12 comprises a circuit 121 for suppressing the phase steps and a computation circuit 122.

The circuit 121 comprises a binary input receiving the write clock HE1 and further comprises a binary output for the auxiliary clock H1. Accordingly it constrains the write clock HE1 to the required transformations, already described, to obtain the ideal auxiliary clock H1. One of ordinary skill in the art is well cognizant about the circuit 121 which shall not be described in further detail.

The computation circuit 122 comprises two binary inputs respectively receiving the clocks HE1 and HL1 and further comprises a digital output for the insertion-command signal CI.

The computation circuit 122 operates as follows: Because receiving the clocks HE1 and HL1, it can sense any pointer adjustment as well as the rate of such adjustments. When it senses a phase step caused by a pointer adjustment in the clock HE1, for instance a 24-bit amplitude phase step, the circuit 122 resolves, as already discussed, said step into a plurality of elementary steps, for instance 24 1-bit steps. Next the circuit 122 assigns a specific time interval, for instance that required to transmit M frames, to the insertion of each elementary phase step in order to make possible, in the manner elucidated below, the superposition of the smoothing pattern. The circuit 122 controls the insertion of each elementary step in the auxiliary clock H1 by increasing or lowering the insertion rate so as to match the frequency at which the pointer adjustments occur.

In order to increase or to lower the insertion rate, the circuit 122, by means of the CI signal, resp. increases or reduces the amplitude of each elementary phase step or lowers or increases resp. the time interval assigned to the insertion of each of these phase steps.

In a first variation, the computation circuit increases the insertion rate when an assumed 24-bit phase step caused by a pointer adjustment and of the same sign as the preceding 24-bit phase step takes place before the time interval required to insert this preceding phase step has run out, and, in the opposite case, by lowering the rate.

The CI signal controlling the insertion of each elementary phase step determines at which time this step must be inserted regardless of its amplitude and of its assigned time interval.

Illustratively, the insertion rate is initialized at its minimum value, that is 1 bit for all M frames. The insertion rate is raised by one notch every time a pointer step is sensed before the preceding ones have finished moving out. In this implementation, an up-down counter is present in the circuit 122 and receives the clock HEI at its "up" input and the clock HL1 at its "down" input, and delivers the instantaneous phase error, that is the number of 1-bit phase steps which must be inserted The state of this counter is monitored at the beginning and at the end of the time interval assigned to the insertion of each 24-bit phase step. If the up-counter state increases in absolute value while the sign remains the same during this interval, the insertion rate shall be increased for the next phase step. In the opposite case, the same insertion rate is preserved. The insertion rate is decreased by one notch each time the counter state returns to zero or changes sign. Without loss of generality, for instance the minimum insertion rate may be set at 1 bit every 128 frames and the next rates at 2, 3 . . . P bits every 128 frames. In this case only the phase-step amplitude varies with the insertion rate. In normal synchronous operation, most of the time this strategy allows moving the phase steps at minimum speed.

In degraded operation, wherein a clock of a network node has slipped, the pointer adjustments are very frequent, and the insertion rate varies about a rate that allows moving all these adjustments. Illustratively a maximum rate of 16 bits every 128 frames allows compensating an instability of 6 ppm. To meet greater instabilities, higher insertion rates must be set, preferably by reducing the time interval assigned to each elementary phase step to 64, then 32, then 16 frames. To avert the danger of overflow in the buffer memory 11, a highly accelerated insertion rate may be defined at each memory edge, the circuit 122 simulating the loading of this memory and increasing or lowering the insertion rate to maintain this loading at an intermediary value as close as possible to half the memory capacity.

Be it borne in mind that two pointer adjustments in one STM-1 signal are apart by at least 4 frames. Assuming that the insertions take place at the rate of 1 bit a line, that is 9 bits per frame in a zone of three octets when starting from each edge of the buffer memory 11, then the possibility of overflow shall be entirely eliminated. Without loss of generality, 3 adjacent octets also may defined in which the flow takes place at the rate of 1 bit a frame. As a result, the transitions between the central memory zone and its two end zones mentioned above shall be gentler. Thereby the buffer memory 11 is resolved into three parts: 3 octets at each edge where the insertion rate is 9 bits a frame, then 3 octets adjacent to each side where the insertion rate is 1 bit a frame, and lastly the central zone where the insertion rate is variable and determined by the computation circuit 122.

In a second embodiment variation, the circuit 122 determines the time interval during which the N last pointer adjustments took place, and increases or lowers the insertion rate in relation to the magnitude of this interval. N is a natural number. Illustratively the circuit 122 comprises a counter ascertaining the number of frames in a time interval wherein 4 or 5 consecutive steps were sensed. Based on this information, the circuit 122 controls the insertion rate in such a way that on average one pointer adjustment shall have been moved before the arrival of the next.

In a first variation of the embodiment of the circuit 122, it was possible only to pass from one insertion rate to another adjacent one in either direction. In the second embodiment mode, it is possible to pass abruptly from a given insertion rate to any of the others allowed by the circuit. As a result it is possible to react rapidly and to match the rate to its proper value when a clock slips from a network node. Another advantage of this embodiment mode is that it prevents the rate from increasing in the case of a double or triple pointer adjustment, which is what automatically takes place in the first embodiment mode of the circuit 122—without being basically necessary. A double or triple adjustment will occur when two or three different network nodes undergo simultaneous pointer adjustments.

In the second embodiment as in the first, the circuit 122 begins to move or to insert the elementary steps of each detected step at the minimum insertion rate, for instance one 1-bit phase step every 128 frames.

The design of the computation circuit 122, which includes for instance a microprocessor, and based on the description above, can be carried out by anyone of ordinary skill in the art.

Figure 4:
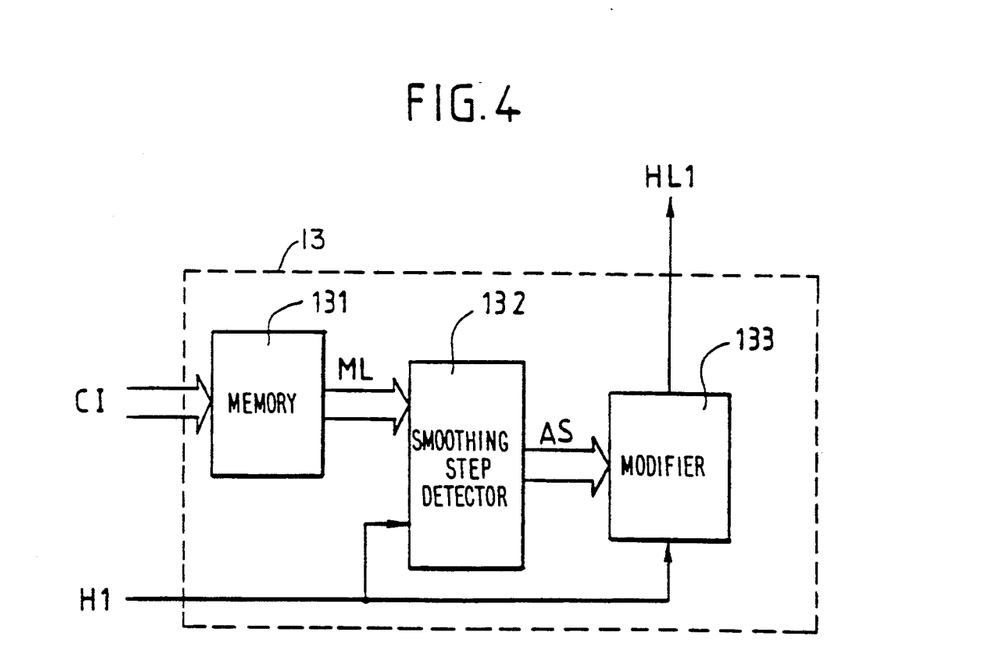
FIG. 4 is a more detailed schematic of the phase-step insertion circuit part of the jitter-reducing circuit of FIG. 2, FIGS. 5A and 5B show the time variations in clock-signal phase at the output of the phase-step insertion circuit of FIG. 4 and also a smoothing pattern used by this circuit.

Presently the insertion circuit 13 shall be described in relation to FIG. 4.

It includes a memory circuit 131 for the smoothing patterns, a circuit 132 determining smoothing steps, and a circuit 133 modifying the auxiliary clock H1.

The circuit 131 comprises a digital input receiving the CI signal and a digital output for the ML signal representing a smoothing pattern.

The circuit 132 comprises a digital input receiving the ML signal, a binary input receiving the auxiliary clock H1 and a digital output for a digital signal AS controlling the addition or suppression of the clock pulses in the auxiliary clock H1.

The circuit 133 comprises a control input receiving the AS signal, a binary input receiving the H1 signal and an HL1 signal binary output.

Presently the operation of the insertion circuit 13 shall be described Through the intermediary of the signal CI, the circuit 131 receives the command to insert an elementary phase step of which the assigned amplitude and time interval are specified by the CI signal. In response to this command, the circuit 131 reads from his memory the corresponding smoothing pattern and issues it to the circuit 132 which determines the smoothing steps.

As shall be elucidated below, the smoothing pattern or law is a binary law defined over the time interval assigned to the insertion of the elementary phase step and this interval, as already discussed, corresponds to the transmission time interval of a given number of frames, for instance 128, 64, 32 or 16 frames, or again, if the insertion rate must be very high, corresponds to a certain number of lines.

The circuit 132 receiving the auxiliary clock H1 determines the time interval assigned to each frame or to each line. Depending on the case, during each of these frames or lines, the binary smoothing law is either a positive transition, or no transition, or a negative transition. The circuit 132 then during the frame or the corresponding line controls the insertion either of a positive phase step, or no phase step, or a negative phase step. For that purpose, by means of the AS signal, it sends to the circuit 133 the command to suppress or to add clock pulses to the auxiliary clock H1. A 3-bit positive phase step results in the suppression of 3 clock pulses of the auxiliary clock H1, whereas a 2-bit negative phase step results in the addition of 2 clock pulses to the auxiliary clock H1, for the time interval corresponding to the frame or line under consideration.

Figures 5A, 5B:
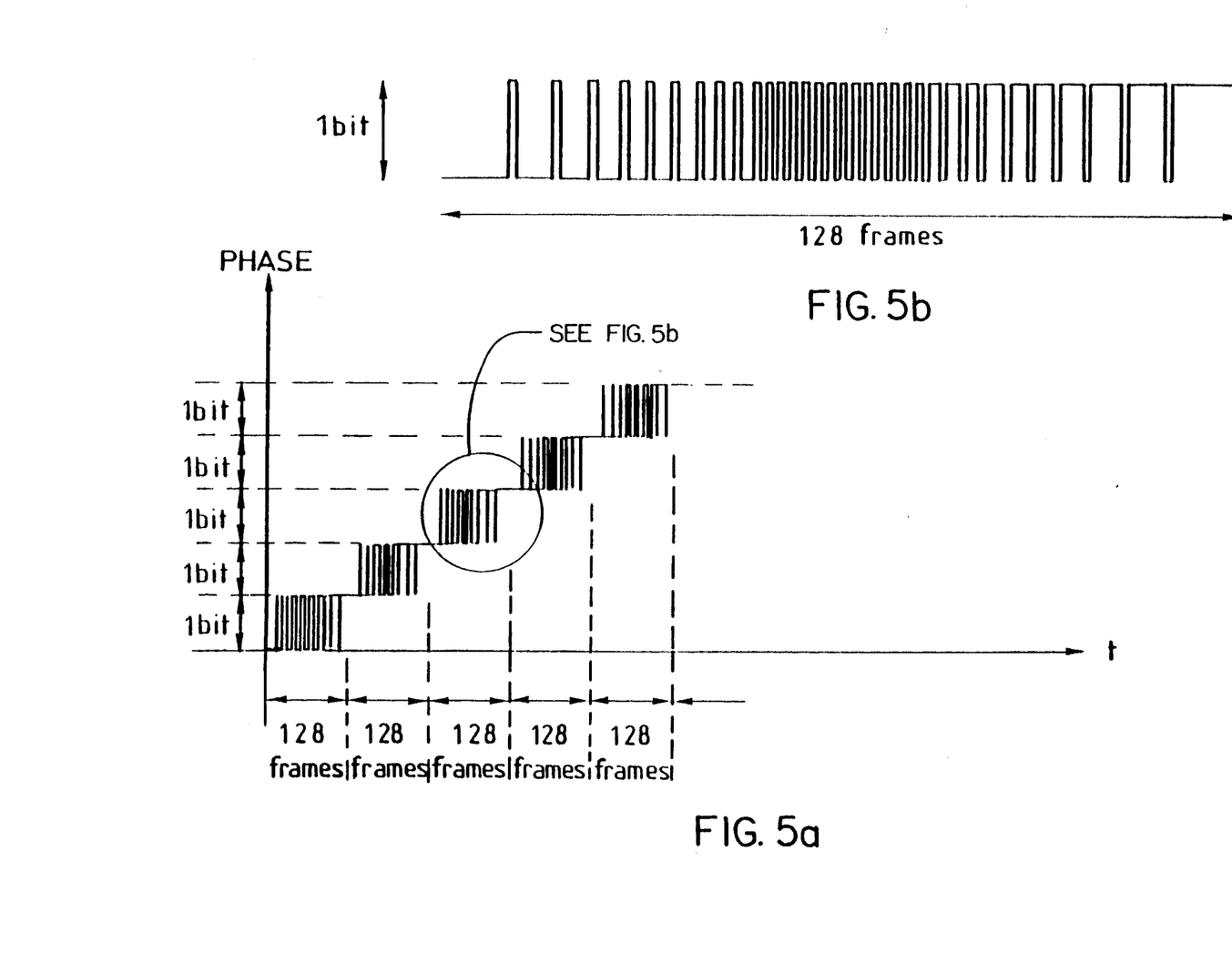

FIG. 5 shows the phase variation of the clock HL1 in the event of an isolated 24-bit negative phase step caused by a pointer adjustment. As already explained, this phase step is resolved into 24 1-bit elementary phase steps and a time-interval of 128 frames is assigned to inserting each of these elementary steps.

For the sake of simplicity, FIG. 5 shows the phase variation only for the first five of the 24 elementary steps. The amplitude of each negative step in this case being negative, and a negative step corresponding to a clock pulse being added, FIG. 5 is in the general form of a stairway of which each tread corresponds to the insertion of a 1-bit phase step. However the smoothing pattern added by the circuit 13 is superposed to each stairway tread. The pattern corresponding to the third tread is shown in greater detail in FIG. 5. It is shown that the deterministic smoothing pattern herein defined over a time interval of 128 frames is a binary law with transitions in sufficient numbers, between its two possible values, for its local average gradually varying from one of the two possible values, here 0, to the other, here 1. In the example shown by FIG. 5, the smoothing pattern therefore comprises a number of positive transitions larger by unity than the number of negative transitions. On balance therefore the pattern is a positive transition, corresponding to the 1-bit elementary phase step which must be inserted, the other phase steps being smoothing phase steps of which the effect will be manifest following filtering in the conventional desynchronizer 2. Because the density of the state 1, i.e. the local average, is low at the beginning the smoothing pattern and high at the end of the smoothing pattern, while being substantially equal to that of the state 0 at the middle of the smoothing pattern, filtering the pattern through a lowpass filter provides a result very close to a straight line passing through the state 0 at the beginning of the pattern and through the state 1 at the end of the pattern.

By superposing such pattern to each level of the stairway phase and by low-pass filtering, a nearly straight line is obtained with the same slope as the stairway. This means that the superposition of the smoothing pattern entails the elimination of quantifying phase steps of the bit-flow circuit 1 following filtration in the desynchronizer 2.

Obviously, when one stairway tread equals P bits, with P a natural number larger than 1, the smoothing pattern which must be added also must have an amplitude of P bits in order to achieve a similar phase smoothing in the event the flow is bit by bit.

Obviously if the elementary phase step to be inserted is positive, the smoothing pattern used is symmetrical with that shown in the FIGURES, i.e., it begins with a local average near 1 and ends with a local average near 0.

Figure 6A:
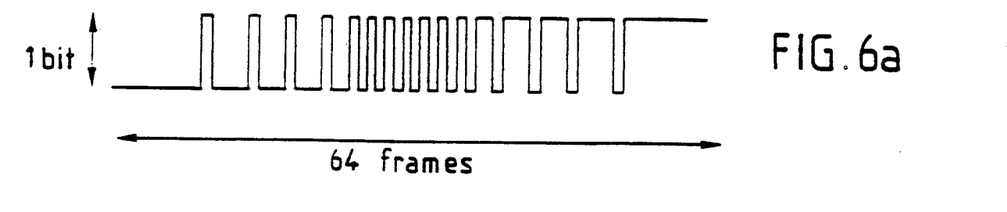
FIGS. 6a, 6b show variations in the smoothing pattern of FIG. 5.
Figure 6B:
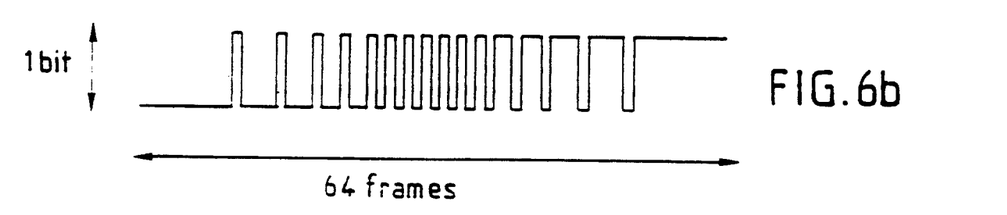

Such smoothing patterns can be designed for other rates of insertion. Illustratively FIGS. 6a, 6b show sequences of 64 points for a circuit moving 1 bit, or P bits every 64 frames. As before it is assumed that the bit insertion or suppression takes place at the frame rate. The number of pattern points then is the number of frames during which 1 bit is moved, or one set of P bits. When the insertion rate is increased, each step comprises fewer frames and therefore the pattern comprises fewer points When the number of points in the pattern is low, the phase steps no longer can be smoothed well. However the smoothing may be improved by inserting the bits at the line rate. There are in fact 9 lines per frame in the example being considered. For an insertion rate of 1 bit, or P bits for every 16 frames, it is thus possible to set up a sequence of 16 ×9=144 points allowing near perfect smoothing of the associated phase steps while retaining a high insertion rate.

Figure 7:
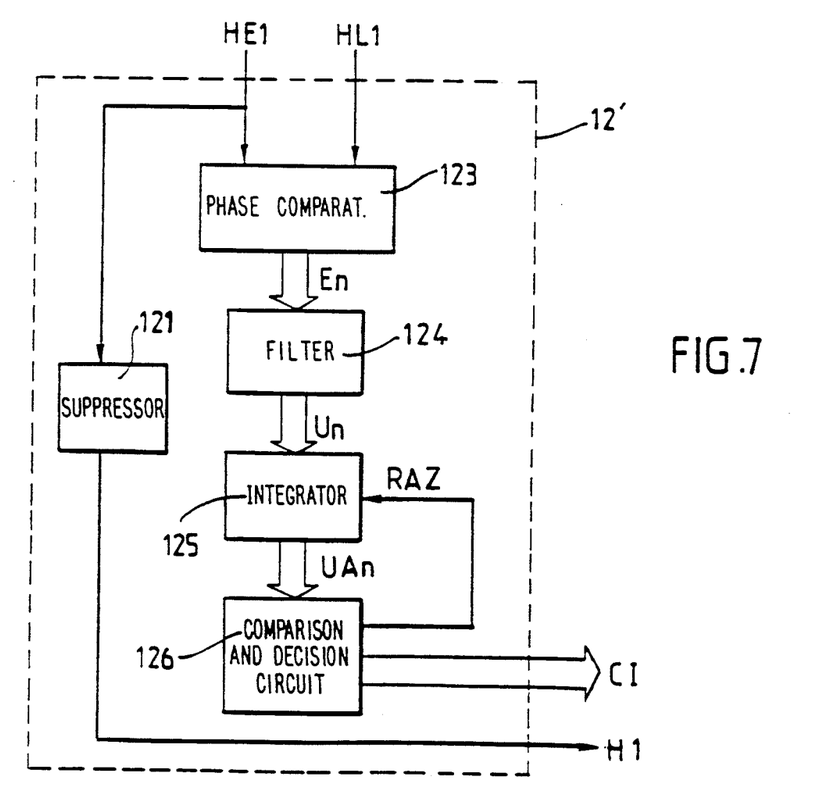
FIG. 7 is a variation of the embodiment of the control circuit of FIG. 3.

A variation of embodiment 12, of the control circuit will now be described in relation to FIG. 7.

Figure 3:
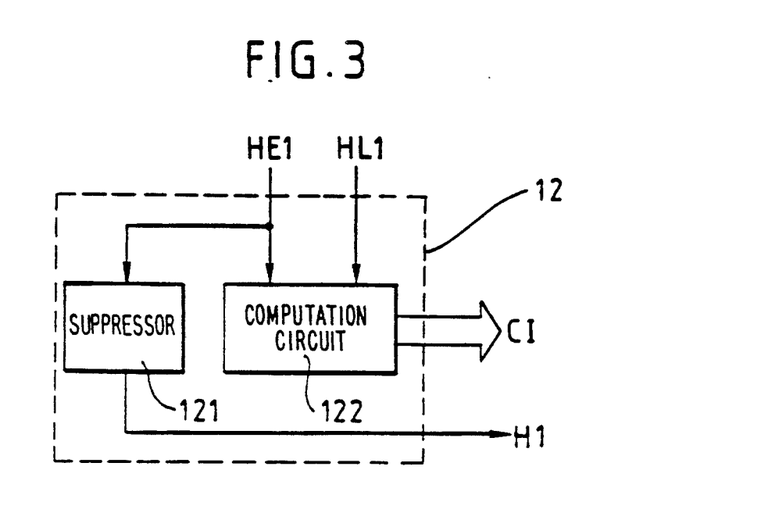
FIG. 3 is a more detailed schematic of the control circuit which is part of the jitter-reducing circuit of FIG. 2.

FIG. 7 again shows the circuit 121 for suppressing pointer adjustments, identical with that of FIG. 3, which transforms the write clock HE1 into auxiliary clock H1.

In addition to the circuit 121, the circuit 12, comprises a phase comparator 123, a digital filter 124, an integrating circuit 125 and a comparison and decision circuit 126.

The phase comparator 123 comprises two binary inputs resp. receiving the clocks HE1 and HL1, i.e. the clocks before and after jitter-reducing processing. The phase comparator 121 also includes a digital output for a digital signal in the form a sequence of digital samples $E_n$ each representing the phase error at a sampling time of order n, n being a natural number.

The filter 124 comprises a digital input receiving the signal $E_n$ and a digital output for a signal in the form of a sequence of digital samples $U_n$ each representing the filtered phase error.

The integrating circuit 125 sums all the samples $U_n$ it has received since the last reset to zero which is fed to it by the decision circuit 126 by means of a binary signal TAZ. In other words the circuit 125 integrates or accumulates the values of samples $U_n$ and emits the accumulated value $UA_n$.

The comparison and decision circuit 126 comprises a digital input receiving the signal $UA_n$ and moreover the binary output for the signal RAZ, further it comprises a digital output for the insertion command CI.

Figure 8:
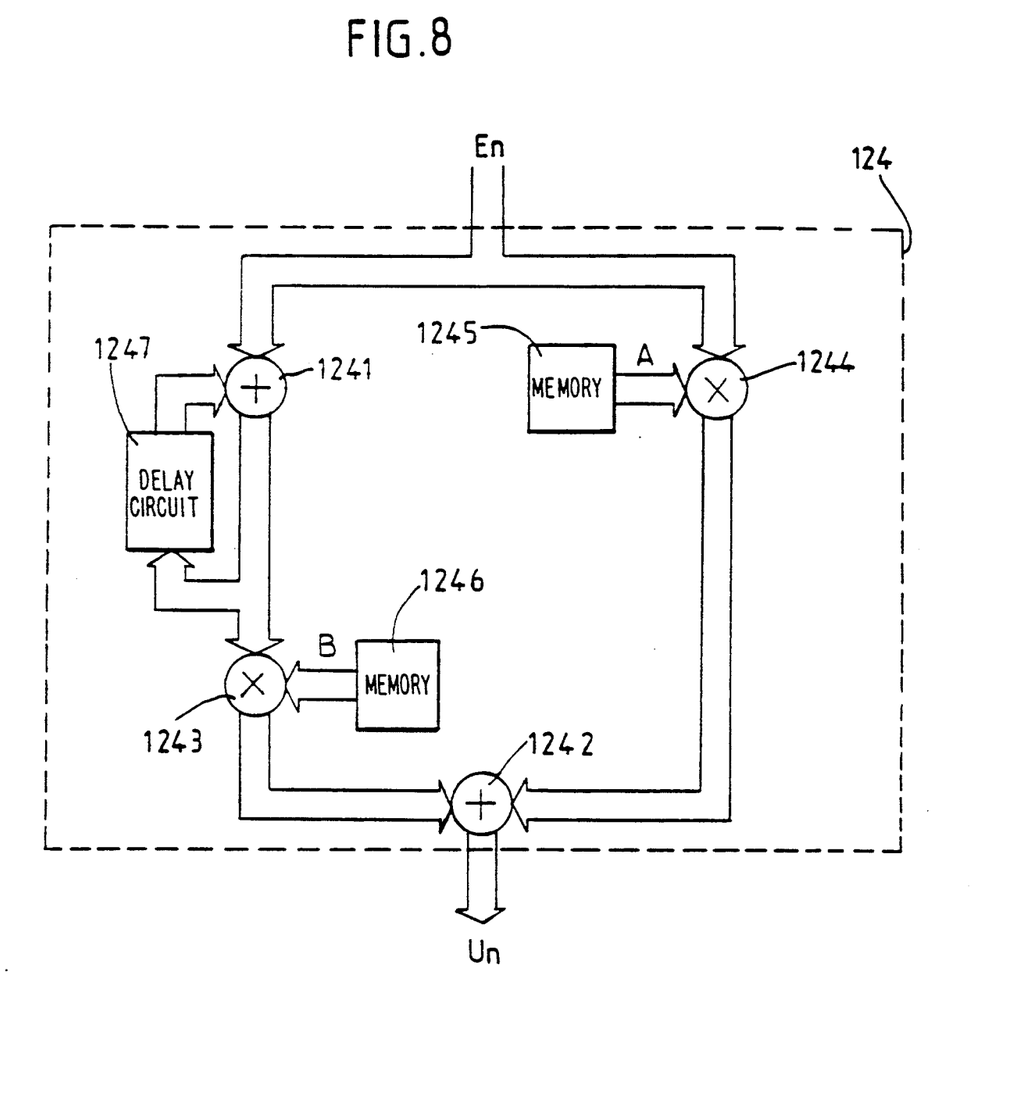
FIG. 8 is a more detailed schematic of the filter of the control circuit of FIG. 7.

As regards FIG. 8, the digital filter 124 comprises two digital summers 1241 and 1242, two digital multipliers 1243 and 1244, two memories 1245 and 1246, and a delay circuit 1247 which in this case illustratively evinces a delay of one frame period.

On one hand the filter 124 comprises a direct path between the input and the output wherein each sample En is merely multiplied in multiplier 1244 by a constant A stored in memory 1245, and on the other hand a path through the summer 1241 and the multiplier 1243 In the summer 1241, each sample Un is added to the output of the summer 1241 during the previous frame as obtained at the output of the delay circuit of which the input is linked to the output of the summer 1241. The output of summer 1241 is multiplied in the multiplier 1243 by a constant B stored in the memory 1246. The outputs of multipliers 1243 and 1244 are summed in summer 1242 into the signal Un given by the formula below $$U_n = AE_n + B \sum_{k=1}^{n} E_n$$

The operation of circuit 12' is akin to that of second-order, digital-phase loops but without an oscillator in the strict sense of the word, this oscillator being replaced by the phase-step insertion circuit.

The values of the constants A and B allows adjusting the noise band of the phase pseudo-loop and also its attenuation factor.

The integrating circuit, or accumulator 125, permits improved approximation of the operation of a digital phase loop by partly getting rid of the fact that in a phase-step insertion circuit, the phase quantifying step is comparatively large whereas the minimum phase step corresponds to an amplitude of one bit.

In this case, where the insertion circuit 13 superposes a smoothing pattern of specific time interval to each 1-bit elementary phase step, and where therefore this time interval must be allowed to lapse before a new elementary phase step can be inserted, the integrating circuit 125 allows taking into account everything that takes place during said interval assigned to the insertion of each phase step.

For that purpose the comparison and decision circuit 126 is designed in such a way that as soon as it commands the insertion of a phase step, the circuit 125 shall be reset to zero. As soon as the time interval assigned to the controlled insertion has lapsed, the circuit 126 compares the value of $UA_n$ accumulated during said interval with a series of suitably staggered positive and negative thresholds and in the light of this comparison decides whether a new phase step must be inserted, and if so, of what sign, what amplitude and what time interval. Thereupon the decision circuit 126 resets to zero the circuit 125 and controls any phase step, and so on.

Be it borne in mind that the control circuit 12' may be used jointly with an insertion circuit 13 that would not superpose a smoothing pattern, the smoothing function in that event being assumed by a noise generator of which the output is added to that of the integrating circuit 125. In this case the elementary phase steps may be inserted at the required time, whereby the comparison of the accumulated value $UA_n$ is simplified.

As regards the above description, the smoothing pattern always was described as being associated to each elementary phase step resulting from the resolution of a multi-bit phase step. Obviously, this is not mandatory and the smoothing pattern may serve even in systems wherein, the phase steps caused by the pointer adjustments being less, for instance being 1 bit, no resolution into elementary steps is required Again, as regards the above description, a particular function was assigned to a corresponding block or circuit. Obviously, as regards practice, several of these functions or even all of them may be assumed by a single processor.

Although the present invention has been described and illustrated in detail it is clearly understood that the same is by way of illustration and example only and is not to be taken by way of limitation, the spirit and scope of the present invention being limited only by the terms of the appended claims.

What is claimed is:

1. A device for reducing jitter caused by pointer adjustment in a digital telecommunications network, each pointer adjustment entailing at least one phase step with an amplitude of at least 1 bit and affecting a first clock signal, said device comprising:

insertion means to insert said phase step caused by the pointer adjustment into said first clock signal and, in its vicinity, a plurality of positive and negative smoothing phase-steps, on the average the number of positive smoothing phase steps being equal to the number of negative smoothing phase steps, and filtering means coupled to said insertion means to filter a second clock signal thus fitted with preceding phase steps and thereby to reduce the quantifying affects of said phase step caused by the pointer adjustment, said device being characterized in that it comprises control means to assign a specified time interval to the insertion of said phase step caused by the pointer adjustment and to resolve this specified time interval into a plurality of corresponding intervals each corresponding to the transmission of a set of bits, and said insertion means upon a third clock signal corresponding to said set of bits will insert either a positive phase step, or no phase step at all, or a negative phase step, depending on a binary smoothing law presenting a transition in one direction, no transition or a transition in the other direction, said binary law being defined over said specified time interval and evincing enough transitions so that its local average progressively changes from one of the two possible values of said binary law to the other of these two possible values, the direction of these change being linked to the sign of said phase step caused by the pointer adjustment.

2. Device defined in claim 1, wherein said sets of bits are frames.

3. Device defined in claim 1, wherein said sets of bits are rows, or lines belonging to frames.

4. Device defined in claim 1, wherein, when each pointer adjustment entails a phase step with an amplitude corresponding to a plurality of bits, said control means resolve said phase step into a plurality of elementary phase steps of which they increase or lower the insertion rate into the third clock signal in a way matching the rate of occurrence of the pointer adjustments.

5. Device defined in claim 4, characterized in that to increase or lower the insertion rate, said control means increase or lower respectively the amplitude of each elementary phase step.

6. Device defined in claim 4, wherein, to increase or lower the insertion rate, said control means lower or increase respectively the time interval assigned to inserting each elementary phase step.

7. Device defined in claim 3, wherein said control means increases the insertion rate when a phase step caused by a pointer adjustment and of the same sign as the preceding one occurs before the time interval required to insert this preceding phase step has lapsed, and lowering the insertion rate in the opposite case.

8. Device defined in claim 3, wherein said control means determines a time interval during which the N last pointer adjustments take place, N being a natural number, and increase or lower the insertion rate in response to the magnitude of this interval.

9. Device defined in claim 3, wherein a buffer memory is provided to store the useful information during the clock-signal processing serving to reduce the jitter, the useful data being written at the rate of the first clock signal prior to processing and being read at the rate of the second clock signal after processing, while the control means simulate loading the buffer memory and increase or lower the insertion rate to keep this loading at an intermediate value.

10. Device defined in claim 3, wherein said control means comprises a phase comparator to compare the phase of the first clock signal prior to the processing serving to reduce the jitter with the phase of the second clock signal after said processing, further comprise a filter coupled to said comparator to filter the output signal of said phase comparator, integrating means coupled to said jitter to integrate over a specified time interval the output signal of said filter and decision means coupled to said integrating means to control the insertion of phase steps in response to the output signal of the integrator.

11. Device defined in claim 10, wherein said filter comprises a path for multiplying an input value by a constant number.

12. Apparatus for reducing jitter caused by pointer adjustment in a digital telecommunications network comprising:
a control circuit responsive to an input data and an input clock signal for detecting occurrence of the pointer adjustment, for generating a control signal representative of the occurrence and direction of the pointer adjustment, and for generating a reference clock signal,
an insertion circuit responsive to said control signal and said reference clock signal for inserting at least one elementary phase step into said reference clock signal in order to generate an output clock signal, said elementary phase step including a plurality of smoothing phase steps formed in accordance with a predetermined smoothing pattern, and
output means responsive to said output clock signal for outputting data.

13. The apparatus of claim 12, further comprising buffer memory means responsive to said input clock signal for recording input data and responsive to said output clock signal for reading recorded data.

14. The apparatus of claim 12, wherein said control circuit generates the reference clock signal corresponding to an input clock signal unaffected by the pointer adjustment.

15. The apparatus of claim 12, wherein said control circuit is responsive to the output clock signal.

16. The apparatus of claim 12, wherein said output means comprises filtering means for filtering the output clock signal to reduce non-linearity caused by the phase step insertion.

17. The apparatus of claim 12, wherein said insertion circuit comprises a smoothing pattern storage responsive to said control signal for fetching the predetermined smoothing pattern.

18. The apparatus of claim 17, wherein said insertion circuit further comprises an insertion control circuit responsive to the predetermined smoothing pattern and the reference clock signal for generating an insertion signal, and an operation circuit responsive to the insertion signal and the reference clock signal for generating the output clock signal.

19. A method for reducing jitter caused by pointer adjustment in a digital telecommunications network comprising the steps of:
detecting occurrence of the pointer adjustment in response to an input data and an input clock signal for generating a control signal representative of the occurrence and direction of the pointer adjustment,
generating a reference clock signal in response to the input clock signal, said reference clock signal corresponding to the input clock signal unaffected by the pointer adjustment,
in response to said control signal inserting at least one elementary phase step into said reference clock signal in order to generate an output clock signal, said elementary phase step including a plurality of smoothing phase steps formed in accordance with a predetermined smoothing pattern, and
filtering said output clock signal to reduce non-linearity caused by the phase step insertion.

20. The method of claim 19, wherein said step of inserting includes:
storing smoothing patterns,
fetching the predetermined smoothing pattern in response to the control signal,
generating an insertion signal in response to the predetermined smoothing pattern and the reference clock signal, and
generating the output clock signal in response to the insertion signal.

* * * * *